United States Patent Office 3,137,547
Patented June 16, 1964

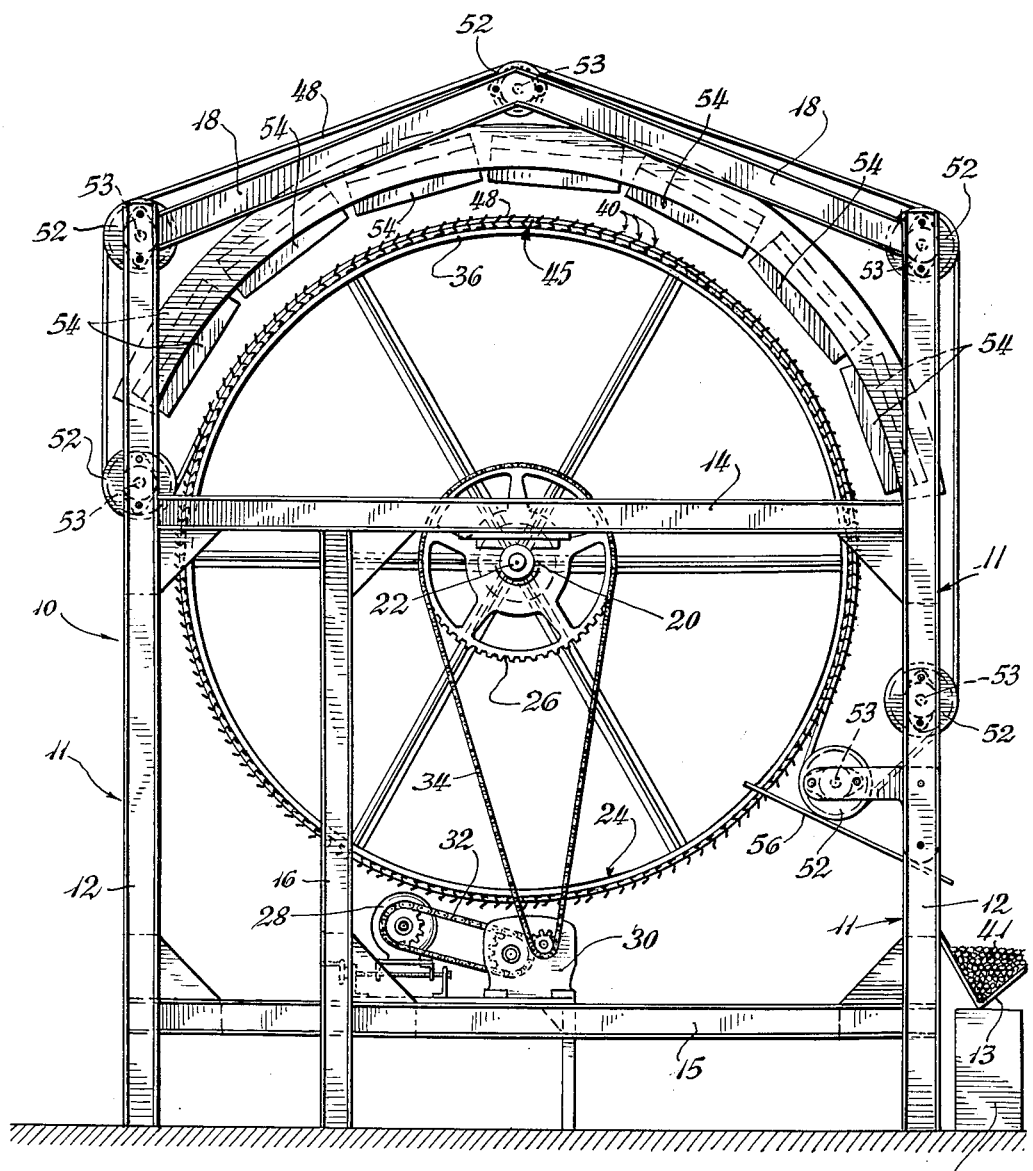

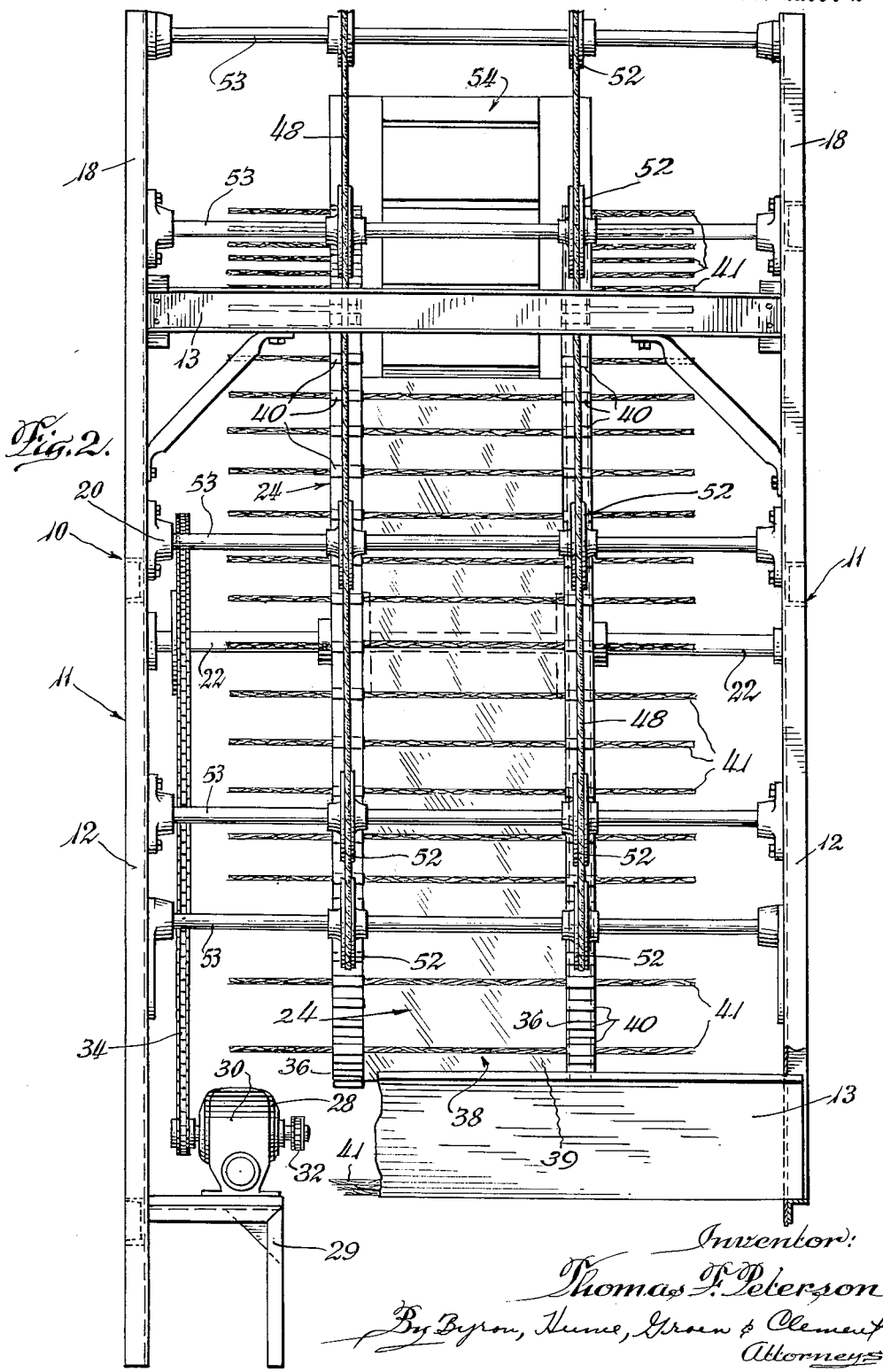

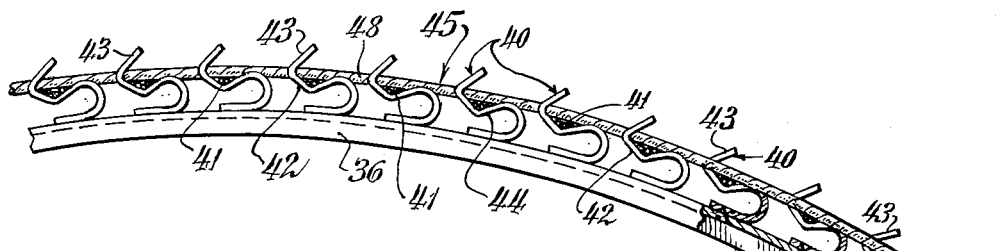
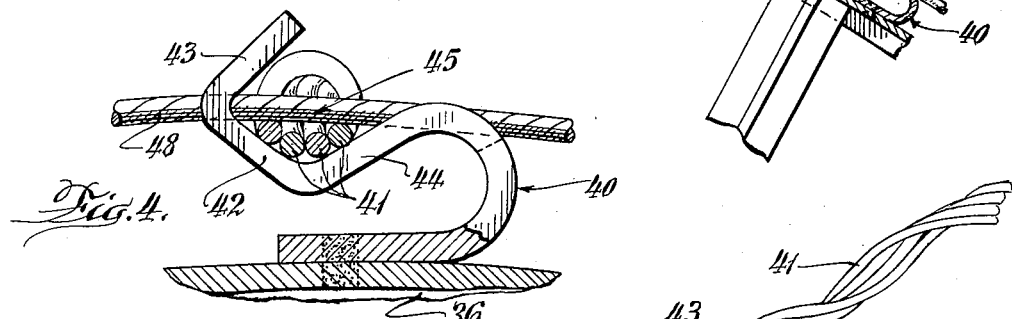
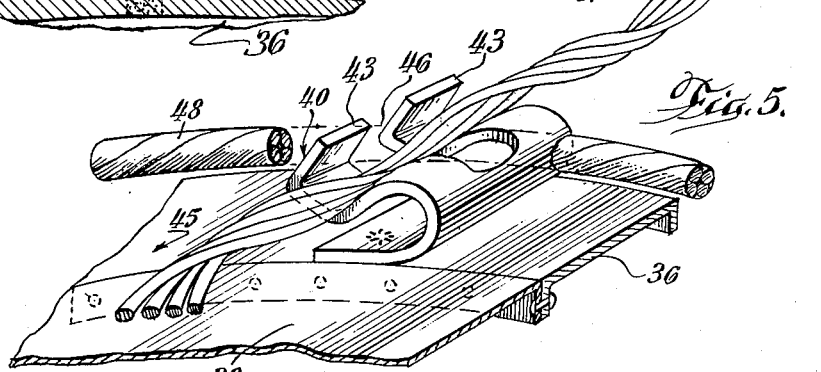
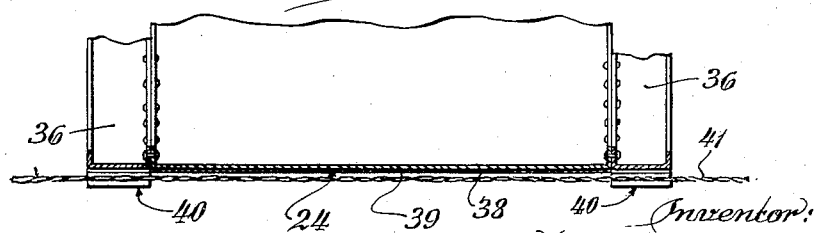

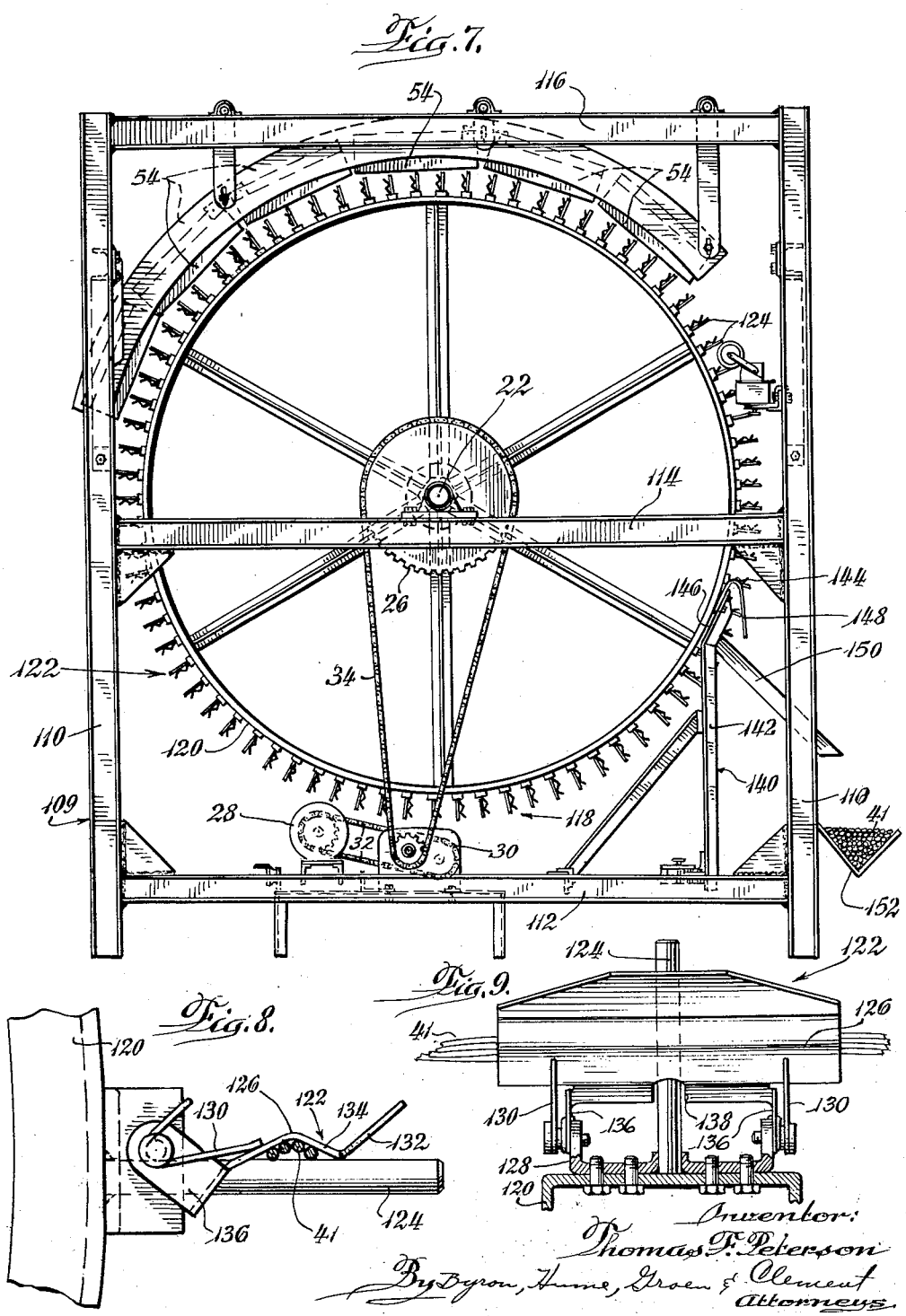

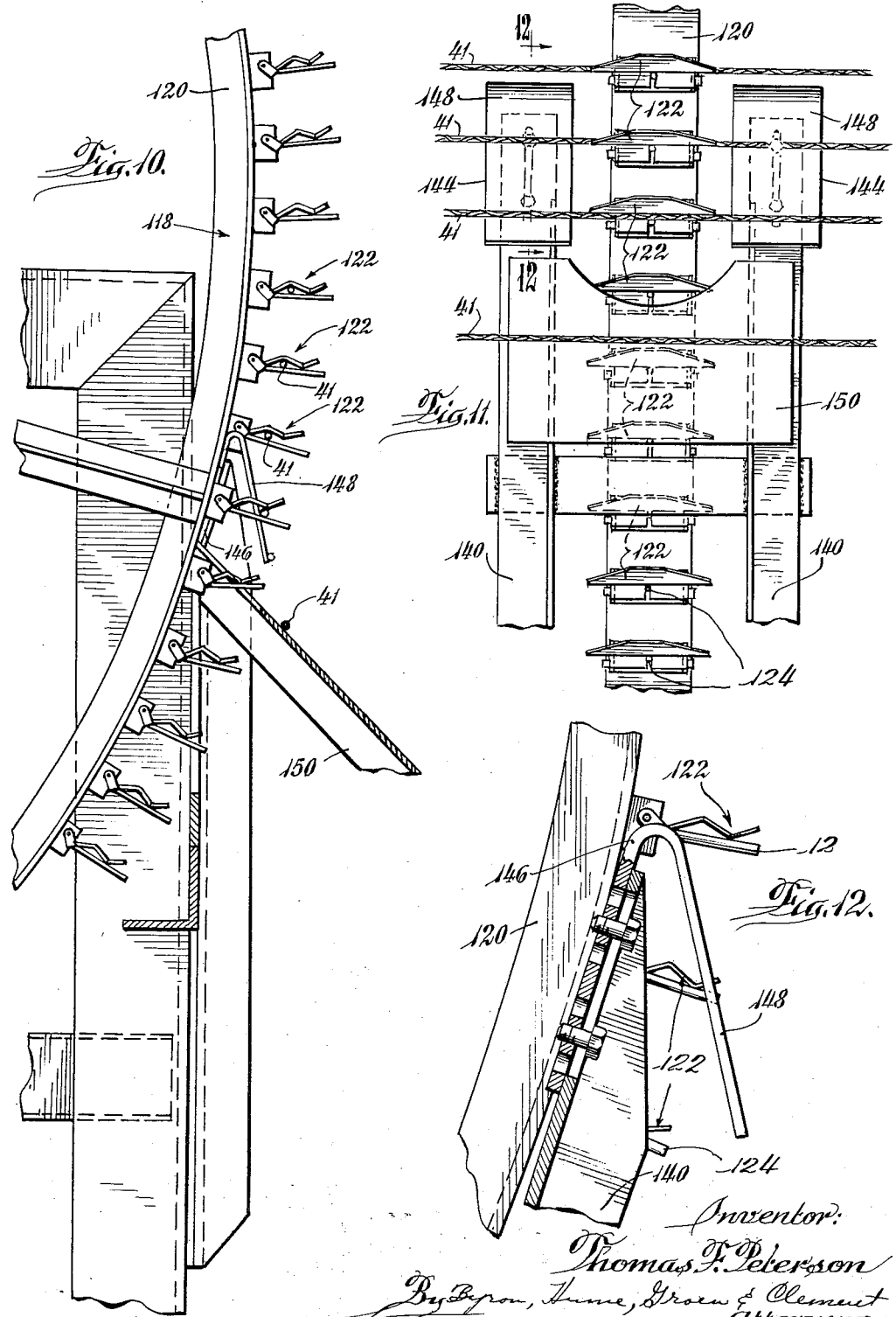

3,137,547
ROTARY DRYING MACHINE
Thomas F. Peterson, Shaker Heights, Ohio, assignor to Preformed Line Products Company, Cleveland, Ohio, a corporation of Ohio
Filed June 10, 1959, Ser. No. 819,419
2 Claims. (Cl. 34—184)

This invention relates to heating apparatus and in particular to heating apparatus especially suited for use in the construction of appliances used in conjunction with linear bodies.

It has been proposed to construct various appliances such as armor sheaths, dead-ends, splices, and the like, to be used in conjunction with linear bodies such as electrical conductors, from a plurality of helically preformed rods. A plurality of these preformed rods of mutually conforming pitch and lay when twisted together form an enclosure, either full or partial. Examples of appliances constructed in this manner are shown in United States Patent 2,761,273 and the following applications for United States patents assigned to the same assignee: Serial 2,200 filed January 14, 1958, now abandoned, and Serial 698,312, filed September 20, 1946, now U.S. Patent No. 2,897,996.

Most of the appliances constructed of helically preformed armor rods consist of several of the same. In order to simplify the application of the rods to linear bodies, it has been proposed in the second mentioned copending application to divide the group of rods into subsets consisting of two or more rods. It has been further proposed in order to facilitate the application of the subsets to the linear bodies to secure the rods comprising each subset into a contiguous relationship.

One means for securing the rods together is by some suitable adhesive which may be applied to the rods in liquid form and then cured. Once the rods are secured in a contiguous relationship, they may be characterized as forming a helical band of open pitch which may be readily applied to a linear body.

One of the problems in securing the rods is the lack of suitable machinery capable of high volume production. Heretofore it has been necessary to carry out the gluing and drying operations by several manual procedures which by nature are relatively slow and laborious. For this reason it is the foremost feature and object of the invention to provide an apparatus that is especially suited for the construction of subsets of helically preformed armor rods in which the rods are secured together in a contiguous relationship. This machine is especially adapted to set or harden adhesive material used to secure the rods.

Another feature of the invention resides in the provision of apparatus that will maintain the rods in the aforementioned desired contiguous relationship until the adhesive material has been cured.

A still further feature of the invention resides in the provision of apparatus especially suited for high volume production of the helically preformed rods and subsets thereof which have been secured in the aforementioned contiguous relationship.

These and other objects of the invention will be apparent upon reading of the specification with reference to the following drawings.

In the drawings:
FIGURE 1 is a side view in elevation of one form of the apparatus embodying the invention.
FIGURE 2 is a front view in elevation of the apparatus shown in FIGURE 1.
FIGURE 3 is a fragmentary view of the rotary drum used in the construction of the apparatus as shown in FIGURE 1.

FIGURE 4 is a fragmentary view of one of the hooks mounted on the rotary drum used for carrying the helically preformed rods, specifically subsets thereof, during the drying or hardening operation.
FIGURE 5 is a perspective view showing a subset of helically preformed rods when carried by the hooks shown in FIGURE 4.
FIGURE 6 is a fragmentary view end section showing the construction of the rotary drum.
FIGURE 7 is a side view in elevation of a modification of the apparatus embodying the invention.
FIGURE 8 is a side view in elevation of the clip means used in the construction of the apparatus shown in FIGURE 7.
FIGURE 9 is a front view in elevation of the clip means shown in FIGURE 8.
FIGURE 10 is a fragmentary side view of the drum used in the construction of the apparatus shown in FIGURE 7.
FIGURE 11 is a fragmentary front view in detail of the drum used in the construction of the apparatus shown in FIGURE 7.
FIGURE 12 is a fragmentary view in section taken along the lines 12—12 in FIGURE 11.

It should be kept in mind that while the subject invention will be described hereinafter in terms of subsets of helically preformed rods, it is equally applicable to a single preformed rod and to a full complement of such rods. Furthermore, the preformed rods when processed as described hereinafter are especially suited for use in the construction of numerous appliances as described hereinbefore.

As was mentioned previously, one of the problems encountered in the construction of such subsets is the lack of suitable apparatus for high volume production of the same. One particular feature necessary in any apparatus used for this purpose is the capability of holding the preformed rods in their contiguous relationship while the adhesive material is being cured. It has been discovered that when a plurality of the rods are arranged in a contiguous relationship and then the internal surfaces of the rods are brought into contact with a pin having a relatively small diameter at substantially right angles thereto, the rods will tend to assume a certain special position with respect to the pin. In essence the subset will tend to assume a position where the first and last rods in the right section coincident with the pin are in touching relationship with the pin. If the subset is continued to be held in engagement with the pin, once it has assumed this position, the rods will be maintained in their contiguous relationship.

Before the rods are to be fed into the apparatus embodying the invention, it is necessary that they be arranged in the contiguous relationship that is ultimately desired. This may be done simply by intertwisting the desired number of loose rods into the contiguous relationship. Either prior to or after the intertwisting operation, the rods must be coated with some adhesive or resinous material of a suitable type and strength for maintaining the rods, once it has been cured, in the contiguous relationship. The coating may be over the entire length of the rods or it may be limited to certain selected areas. The coating operation may be carried out in any suitable manner such as conventional apparatus well known in the prior art or even manually such as by dipping.

Referring now to FIGURE 1, there is shown a side view in elevation of the apparatus embodying the invention generally denoted by the numeral 10. The apparatus includes a pair of spaced side frames 11, each of which consists of a plurality of vertical supports 12 and cross pieces 14 and 15, and which are interconnected by the cross members 13. Secured to the upper ends of the vertical supports 12 of both frames 11 are the diagonal members 18 which form an apex at their juncture. Although this frame assembly is especially suited for the construction of the apparatus 10 embodying the invention, it is to be understood that it may be modified where desired or necessary to suit a particular application.

On the underneath side of the horizontal brace 14 there is secured a journal 20, as shown in FIGURE 1, which rotatably receives the axle 22 of the drum 24. A sprocket 26 is keyed on the axle 22 for purposes of driving the drum 24. The sprocket is driven by a motor 28 of some suitable type mounted on the table 29. The motor 28 drives a gear reduction unit 30 by the sprocket chain 32. The gear reduction unit 30 in turn is drivingly connected to the sprocket 26 by the sprocket chain 34. The drum 24 is fixed on the shaft 22 and is adapted to rotate therewith. In its preferred embodiment the drum 24 includes the adjustably spaced annular flanges 36 as best shown in FIGURE 6. The spacing of the flanges 36 is dependent upon the pitch length of the helices and is preferably a multiple thereof, so that the helices can assume the desired relationship with the means on each flange, for holding them to the drum as will be explained hereinafter. For example, if the helices have a pitch length of three inches, then the space between the flanges will be a multiple thereof.

Intermediate the flanges 36 is a cylinder 38, constructed of sheet metal or the like. The cylinder 38 is secured to the flanges 36 by some suitable means, such as rivets, welding or the like, as shown in the drawings. A sheet or coating of a heat-reflecting material 39 is secured to the outside surface of the drum 38 for reasons that will be apparent later on.

A plurality of spaced hooks 40 for supporting the subsets 41 during the drying operation is secured to each of the annular flanges 36, as shown in FIGURE 3. The hooks are preferably regularly spaced and circumscribe the flanges.

In FIGURES 4 and 5, it can be seen that a cross-section of each of the hooks is somewhat of an S shape with the subset normally riding in the cradle formed by the sections 42, 43, and 44. At the upper end of each hook 40 there is a slot 46 which extends through the hook to the upper end of the section 44. The slot 46 is adapted to receive a cable 48, as shown in FIGURES 3 and 5, in order to hold the subsets 41 within the cradle 45. Referring back to FIGURE 1, it can be seen that the cable 48 is in a continuous form, and is associated with the upper portion of the drum 24. The cable 48 travels over the pulleys 52 mounted on the shafts 53 which extend between the frames 11.

As shown in FIGURE 5, the subset 41 is tightly clamped by the cable 48 within the cradle formed by the sections 42, 43, and 44. The cable 48 further acts as a pin so as to cause the subset to seek a position in which the internal faces of the first and last rods are in contact therewith. Once the subset has assumed this position, the helical rods will be maintained in a contiguous relationship, as described previously.

As will be noticed in FIGURE 1, the lowermost pulley on the intake side of the rotary drum 24 is slightly above the horizontal diameter of the drum. This arrangement permits access to the drum 24 by the operator so as to facilitate the placing of the subsets within the hooks 40. When the hooks are in this position, the subsets naturally lie out of their own accord within the cradle construction formed by segments 42, 43, and 44, since the latter are in an upright position. As the hooks 40 approach the right hand or output side of the drum 24, as shown in FIGURE 1, the cradle construction formed by segments 42, 43, and 44 moves into an inverted position so that the subsets would tend to naturally fall out unless retained by some auxiliary means, such as the cable 48. For this reason the lowermost pulley 52 on the output side of the drum 24 extends considerably below the horizontal diameter of the drum.

A series of heating elements 54 extends around a portion of the upper periphery of the drum 24. These heating elements 54 are arranged in a generally arcuate manner so that they may be moved into a closely spaced relationship with the drum. The heating elements 54 may be of any suitable type that will harden the adhesive material used for securing the grit to the subsets. One particular type of heating element that is especially suited for this use is the so-called infrared lamp. These lamps provide a source of intense heat, which serves to cure or harden the adhesive material within a relatively short period of time. As is mentioned previously, it may be advantageous, particularly when using infrared lamps, to provide some sort of reflecting material 39, such as aluminum foil, along the surface of cylinder member 38. In this manner it is possible to reflect the heat so that all of the surfaces of the subsets coated with the adhesive material are equally exposed. After the subsets have passed under the arcuate bank of heating elements 54, they may then be removed by some suitable means for storage until ready to be used.

One means for removing the subsets is shown in FIGURE 1. This means in its preferred embodiment consists of the inclined wire fingers 56, which are laterally spaced to each of the annular elements 36. The wire fingers 56 are secured to the vertical supports 12 so as to provide a conveying surface away from the drum 24. In this manner the fingers 56 are adapted to catch the ends of the subsets as the drum 24 is rotated, so that the subsets are conveyed to some suitable container.

It will be noticed that the fingers 56 are below the last point of contact of the cable 48 with the subsets 41. As a result, the subsets fall a short distance from the hooks 40 onto the fingers 56 and slide or roll downwardly thereon until they are received within a suitable storage device 57 as shown in FIGURE 1.

Referring now to FIGURE 7, there is shown a second form of the apparatus embodying the invention. In this modification parts which correspond to like parts in the previously described modification will be designated by like numerals.

This modification of the apparatus includes the laterally spaced frame members 109, of which only one is shown and which includes the vertical members 110 and the horizontal members 112, 114, and 116. A motor 28 suitable for driving the rotary drum 118 is mounted on the member 112, and is drivingly connected to the gearbox 30. The gearbox 30 is in turn connected by means of the chain 34 to the sprocket 26 which is drivingly connected to the drum 118.

A plurality of heating elements 54 of the type previously described depend from the horizontal frame member 116 as shown in the drawings and are in closely associated relationship with the rotary drum 118. The drum 118 includes two axially spaced annular flanges 120, of which only one is shown, similar to that shown in FIGURE 6 with reference to the first described form. The flanges 120 preferably are adjustably spaced, for reasons that will be fully apparent later on. A cylinder of heat reflective material may be disposed between the spaced annular flanges 120, as was described previously.

In FIGURE 7, is can be seen that there is a plurality of clip assemblies generally denoted by the numeral 122 secured in a circumferentially spaced relationship about the annular flanges 120. The clip assemblies 122 are constructed so as to maintain a plurality of helically preformed armor rods in a contiguous relationship, as will be described more fully hereinafter.

Referring now to FIGURES 8 and 9, there are shown a side view and a front view respectively of the clip assemblies 122. Each clip assembly 122 includes a pin member 124 which is mounted in a substantially radial relationship with the annular flange 120. In the preferred embodiment the corresponding pin members 124 on the adjustably spaced flanges 120 are spaced some multiple of the pitch length of the helices so that both pin members 124 when associated with each helix or group of helices assumes a chordal relationship, as will be explained fully later on. The clip assembly 122 further includes a spring biased flange 126 which normally engages the pin 124.

The flange 126 is pivotally mounted on the channel member 128 which in turn is secured to the annular flange 120. The flange 126 is normally biased into engagement with the pin 124 by means of the spring 130 as shown in FIGURES 11 and 12. The flange 126 is substantially wider than the pin 124 so as to provide sufficient bearing surface for the subsets 41.

As shown in FIGURE 8, the flange 126 consists of a first section 132 which is normally disposed in a diverging relationship with the pin 124. The section 132 provides a guide means for facilitating the insertion of the subsets 41 between the flange 126 and the pin 124. The flange 126 further includes the V section 134, one leg of which is integral with the section 132. The apex formed by the section 132 and the associated leg of the V section 134 normally abuts the pin 124 as shown in FIGURE 8. The V section 134 generally conforms to the ouside arcuate circumference of the subset 41 when the latter assumes its normal position relative to the pin 124. The flange 126 further includes a base portion 136 which is pivotally secured to the channel member 128 as was described previously. The base portion 136 is provided with a slot 138, as best shown in FIGURE 9 which embraces the pin 124 so as to permit the sections 132 and 134 to assume their desired positions relative thereto.

It can now be seen that the spring clips as described with reference to FIGURES 8 and 9 are designed so as to facilitate the attachment of the subsets 41 to the rotary drum 118. Thus, after the preformed armor rods have been forced into their contiguous relationship by the operator and the glue or adhesive applied thereto, they may be readily attached to the drum 118 for the curing operation. Moreover, the pin 124 and the flange 126 are designed so that the armor rods are maintained in the desired contiguous relationship during the curing operation.

Referring now to FIGURE 7, there is shown a guide assembly generally denoted by the numeral 140 for removing the subsets 41 from the spring clip assemblies 122. The removal assembly 140 includes a vertical support member 142 mounted on the horizontal member 112 in any suitable fashion. At the upper end of the support member 142 there is secured a guide member 144 composed of a base portion 146 and a camming portion 148. The base portion 146 and the camming portion 148 are arranged in a substantially V-shaped construction and are positioned so that the camming portion 148 lies along a projection of a tangent or a chord of the rotary drum 118. As a result of this arrangement, when the rotary drum 118 is rotated with respect to the guide bar 144, the helically preformed armor rods within the clips 122 are forced outwardly away from the periphery of the drum as they contact the camming member 148. As the drum continues to rotate, the subsets 41 separate the flanges 126 from the pins 124 until they are completely free of the clips 122 so as to fall therefrom due to the force of gravity.

In its preferred form the rotary drier includes a pair of laterally spaced conveyor bars 150 which are mounted on the upright supports 142, of which only one is shown. As best shown in FIGURE 11, the conveyor bar 150 is of an apron-like construction which straddles each of the annular members 120 so as to receive each of the subsets as they are forced from the clips 122. Thus, when each subset 41 is removed, each of its ends is received by a conveyor member 150. The subset then slides downwardly until it reaches the lower end of the conveyor which is in association with suitable storage or handling facilities. For example, as shown in FIGURE 7, there is a V-shaped trough 152 which is disposed directly beneath the lower end of the conveyor member 150 for receiving the subsets.

Although two embodiments of the holding means are specifically set forth hereinbefore, it can be seen that other embodiments are possible. Broadly, the holding means may be characterized as including two clamping elements in which one of the elements presses against the chord of the arc of the subset so as to maintain the helical elements in their contiguous relationship.

It should be kept in mind that while the apparatus embodying the invention has been described in terms of helically preformed rods and subsets thereof, it may be used in connection with other devices, and in particular devices in which it is desired to apply a coating of resinous or adhesive material and then harden the coating. Although a specific embodiment of the invention has been disclosed herein, it is to be understood that this is merely by way of example and is not to be construed in any manner as a limitation. It is contemplated that certain modifications may be made within the scope of the claims without departing from the spirit of the invention.

What is claimed is:

1. A rotary drying machine for effecting the hardening of adhesive material applied to a plurality of helically preformed rods that mutually conform as to helical diameter, hand of lay, and pitch length; which machine comprises a support structure; a substantially cylindrical drum rotatably mounted on said support structure; a pair of adjustable annular flanges secured to said drum in spaced relation to each other; said flanges being selectively spaced apart by a distance corresponding to a multiple of the pitch length of the helically preformed rods; a driving motor; means drivingly connecting said motor to said drum so that said drum is rotatable at a preselected rate; a plurality of aligned pairs of clip means spaced around the circumferences of said annular flanges; said clip means including a pin member and including a resiliently biased member for receiving said preformed rods and for biasing said rods in fixed relation against said pin members so that the rods are grasped at corresponding right sections and are maintained in a contiguous relationship; a plurality of heating elements extending in adjacent relationship around the upper peripheral surface of said drum and in spaced relation thereto; each of said heating elements being substantially fixed with respect to said drum; and a guide assembly for removing the helically preformed rods from said clip means after the rods have been advanced past said heating elements; said guide assembly including a camming member that is engageable with the preformed rods to effect the separation of said pin members and said corresponding resiliently biased members.

2. A rotary drying machine for effecting the hardening of adhesive material applied to a plurality of helically preformed rods that mutually conform as to helical diameter, hand of lay, and pitch length; which machine comprises a support structure; a substantially cylindrical drum rotatably mounted on said support structure; a pair of adjustable annular flanges secured to said drum in spaced relation to each other; said flanges being selectively spaced apart by a distance corresponding to a multiple of the pitch length of the helically preformed rods; a driving motor; means drivingly connecting said motor to said drum so that said drum is rotatable at a preselected rate; a plurality of aligned pairs of hooks secured to and spaced around the circumferences of said annular flanges; said hooks having a generally S-shaped cross sectional configuration and being secured to said flanges so that the upper end portion of each extends above the surface of said flanges; said upper end portion of each of said hooks being slotted and being formed to define a rod receiving cradle that extends across said hook and transversely of said slot; a pair of cable members extending substantially around said drum and in alignment with said hooks so that said cable members pass through and are maintained within said slots; said cable members being engageable with portions of the preformed rods positioned within the cradles defined by said hooks so that said rods are confined within said hooks in fixed contiguous relationship; a plurality of heating elements extending in adjacent relationship around the upper peripheral surface of said drum and in spaced relation thereto; each of said heating elements being substantially fixed with respect to said drum; and means for removing the helically preformed rods from said hooks after the rods have been advanced past said heating elements.

References Cited in the file of this patent

UNITED STATES PATENTS

| | | |
|---|---|---|
| 2,087,809 | Nichols et al. | July 20, 1937 |
| 2,112,621 | Henszey et al. | Mar. 29, 1938 |
| 2,253,333 | Jaeckel | Aug. 19, 1941 |
| 2,318,533 | Selvig | May 4, 1943 |
| 2,713,960 | Siegal | July 26, 1955 |
| 2,779,848 | Bosomworth et al. | Jan. 29, 1957 |
| 2,988,199 | Pinkham | June 13, 1961 |